United States Patent [19]
Murayama

[11] 3,843,570
[45] Oct. 22, 1974

[54] PROCESS FOR PRODUCING A POROUS MATERIAL OF POLYTETRAFLUOROETHYLENE

[75] Inventor: Naohiro Murayama, Iwaki, Japan

[73] Assignee: Kureha Kagaku Kogyo Kabushiki Kaisha, Tokyo, Japan

[22] Filed: Jan. 25, 1974

[21] Appl. No.: 436,489

Related U.S. Application Data

[63] Continuation of Ser. No. 138,279, April 28, 1971, abandoned.

[52] U.S. Cl. ......... 260/2.5 M, 117/100 C, 210/500, 260/2.5 HA, 260/2.5 R, 260/2.5 D, 260/30.4 R, 260/30.8 DS, 260/32.4, 260/32.6 R, 260/32.8 R, 260/33.6 UA
[51] Int. Cl. ............................................. C08j 1/28
[58] Field of Search ....... 260/2.5 M, 2.5 HA, 2.5 R, 260/2.5 D; 117/100 C

[56] References Cited
UNITED STATES PATENTS

| | | | |
|---|---|---|---|
| 3,054,761 | 9/1962 | Moore et al. | 260/2.5 HA |
| 3,121,698 | 2/1964 | Orsino et al. | 260/2.5 HA |
| 3,407,249 | 10/1968 | Landi | 260/2.5 M |
| 3,666,693 | 5/1972 | Chopiro et al. | 260/2.5 M |

Primary Examiner—Morton Foelak

[57] ABSTRACT

A porous material comprising polytetrafluoroethylene and having micropores is obtained by polymerizing a polymerizable monomer capable of forming a thermoplastic resin, which has been adsorbed or attached to fine particles of polytetrafluoroethylene, milling the resulting polymeric mixture of the polytetrafluoroethylene and the thermoplastic resin at a temperature higher than the softening point of the thermoplastic resin to form a shaped article and then removing therefrom said thermoplastic resin.

8 Claims, No Drawings

PROCESS FOR PRODUCING A POROUS MATERIAL OF POLYTETRAFLUOROETHYLENE

This is a continuation of application Ser. No. 138,279 filed on Apr. 28, 1971, now abandoned.

DETAILED EXPLANATION OF THE INVENTION

This invention relates to a process for producing from polytetrafluoroethylene a porous material having uniform, fine, continuous pores and possessing high strength and excellent bending characteristics.

It is widely known that polytetrafluoroethylene has resistivity to heat and chemicals such as almost all of acids, alkalis and organic solvents, maintains its excellent mechanical properties over a wide range of temperatures from extremely low temperature to 250°C. and can thus be used durably. This resin is not wettable with water and is extremely low in water absorption rate and adhesivity, thus being repellent to almost all materials. In addition, this resin possesses excellent electro-insulating property, dielectric property and self-lubricating property. Because of said useful characteristics, therefore, polytetrafluoroethylene is widely employed in a variety of fields.

A porous material manufactured from polytetrafluoroethylene can be used in the presence of any chemicals.

For example, a filter manufactured by shaping this resin has an extremely long use life in the presence of chemicals such as sulfuric acid, nitric acid, chromic acid and sodium hypochlorite even at a high temperature and exhibits another characteristic of non-adhesivity.

This resin is utilizable as gas filter for manufacturing semiconductors and as water separator. A porous material of this resin is used as partition membrane for an oxygen-generating electrolysis and edible salt electrolysis or as partition membrane for fuel cells, sulfuric acid cells and alkali cells. Further, such porous material is used not only as protecting material required for permeation of gas but also for separation of isotopes by way of gas diffusion.

A variety of methods as will be itemized hereunder has generally been adopted hitherto for manufacturing a porous material from a high polymer:

1. a method wherein a variety of foaming agents are used to cause foaming,
2. a method wherein foaming is effected mechanically,
3. a method wherein such high polymer is mixed with fine particles capable of being easily leached with water or a solvent, the mixture is milled optionally with a solvent to form a shaped article and then the fine particles are leached out,
4. a method wherein a solvent, plasticizer and/or non-solvent is used to form a gel of the high polymer and thereafter the solvent or the like is removed therefrom by extraction or evaporation,
5. a method wherein fine particles of the substance are integrally bonded by sintering, and
6. a method wherein fine particles of the substance are integrally bonded by the aid of a binder.

Polytetrafluoroethylene has an extremely high melt viscosity even at a temperature considerably higher than the melting point and shows no fluidity. In case this resin is to be foamed, therefore, it will be necessary to effect the foaming of the resin by pressure of a gas formed by decomposition with foaming while the resin is maintained in fluid state at a temperature higher than its melting point. Accordingly, said Methods 1 and 2 have a disadvantage, as they are hardly applicable to the case of forming a uniformly foamed material from polytetrafluoroethylene. The Methods 4 and 6 are also not applicable for the reason that a liquid which can swell polytetrafluoroethylene has not yet been found. Thus, only Methods 3 and 5 are adaptable in the case of polytetrafluoroethylene.

As considerably high pressure is needed for the shaping of polytetrafluoroethylene, a method similar to conventional powder metallurgy techniques is often adopted. When a porous material of polytetrafluoroethylene is manufactured according to such method, however, the cellular structure will be clogged. Consequently, it is difficult to determine the adoption of the Method represented by 5 simply as in the case of using other resins. Thus, a method utilizable in the case of polytetrafluoroethylene comprises shaping polytetrafluoroethylene admixed with a substance capable of being removed by evaporation, extraction or solvent treatment, and then removing the substance to form a porous material.

This invention provides a process for producing a shaped material of polytetrafluoroethylene which process is different from the aforementioned methods and comprises polymerizing a polymerizable monomer capable of forming a thermoplastic resin, the monomer having been adsorbed or attached to fine particles of polytetrafluoroethylene, milling the resulting polymeric mixture of the polytetrafluoroethylene and the thermoplastic resin at a temperature higher than the softening point of the thermoplastic resin to form a suitably shaped article and removing therefrom the thermoplastic resin.

In said polymeric mixture, the fine particles of polytetrafluoroethylene undergo shearing stress, as the thermoplastic resin becomes fluid by milling, and are stretched to fibrous form. Further continuation of milling permits these fibers to be entwined with one another and finally forms a network structure of the fibers. In the case of milling, flow of the resin is locally not uniform and less directional unlike the case of simple rolling or stretching. Polytetrafluoroethylene is stretched to fibrous form by such milling and the direction of fibers is indefinite. Continuation of milling results in entwining of fibers to form a network structure.

It is a characteristic feature of the process of this invention that as the minute structure of fine polytetrafluoroethylene particles is fixed by the coated resin to secure perfect dispersion, mutual adhesion of the polytetrafluoroethylene particles is prevented and the minute structure is not lost during the milling treatment, thus making it possible to provide a porous body having very fine pores. Any monomer which forms a thermoplastic resin by polymerization can be used as the polymerizable monomer of this invention. Especially preferable are methyl methacrylate, styrene, vinyl chloride, vinylidene chloride, and copolymers thereof.

The monomer used for polymerization is effective in a small amount so far as the amount is at least 30 percent by weight based on polytetrafluoroethylene. In case the amount of the monomer is large, the polymerization may be carried out in the state of polytetrafluoroethylene powders being dispersed into the monomer. This is the most effective method for dispersing polytetrafluoroethylene into the thermoplastic resin.

On milling of the polymeric mixture, other resins may be incorporated thereinto, if necessary. For example, the milling treatment may be carried out after adding polyvinyl chloride to a mixture obtained by polymerizing methyl methacrylate adsorbed to polytetrafluoroethylene. The milling treatment is operated with a known means which is utilized for thermoplastic resins, such as milling roll, Banbury mixer, extruder or kneader, among which a powerful heavy duty means is desirable.

As the milling becomes complete, a uniform sheet having micropores is obtained. When polytetrafluoroethylene is milled with other thermoplastic resin (or in other words, polytetrafluoroethylene is not in the form of a polymeric mixture), the milling treatment becomes difficult as the stretching of polytetrafluoroethylene proceeds to form a network structure. This tendency becomes notable as the mixing ratio of polytetrafluoroethylene to the thermoplastic resins becomes larger. This difficulty may be overcome according to the type of milling but milling has to be stopped at an adequate degree.

Contrary to this, because of a minute structure of the polymeric mixture used in the process of this invention, polytetrafluoroethylene fibers obtained by milling the mixture are very fine and the milling operation itself for the polymeric mixture is easier than that for a mere mixture of the polymers. In addition, the milling operation is also possible with the polymeric mixture containing polytetrafluoroethylene in a larger proportion.

After completion of the milling operation, the mixture may be shaped by various ways of stretching including monoaxially or biaxially stretching with a roll, press or the like, stretching from two sides, stretching with a roll varying in speed and stretching according to other methods.

It is of course possible to shape the mixture by reverse overlapping or knitting. It is also possible to overlap or combine the mixture with other substances. In order to remove the thermoplastic resin from polymeric mixture subjected to milling followed by shaping, a variety of methods can be applied, including those utilizing extraction with a solvent, thermal decomposition, chemical dissolution and chemical modification. If necessary, a combination of these methods may be applied for this purpose.

For example, a method utilizing extraction with a solvent or thermal decomposition is applicable to the case where the thermoplastic resin in the polymeric mixture is polymethyl methacrylate, while a method utilizing extraction with a solvent is applicable to the case where the resin is polyvinyl chloride.

Among these, however, the method utilizing extraction with a solvent is most convenient and advantageous for the reason that it needs no heat treatment. A solvent utilizable for such extraction is desirable.

For example, when the thermoplastic resin formed by adsorption and polymerization is polymethylmethacrylate, benzene, toluene, ethylbenzene, chloroform, methyl ethyl ketone, acetone, tetrahydrofuran, tetrachloroethane, acetonitrile and butanone can be used. When the resin is polystyrene, benzene, toluene, tetrahydrofuran and chloroform can be used. When the resin is polyvinyl chloride, tetrahydrofuran, cyclohexanone, nitrobenzene, dimethylsulfoxide and dimethylformamide can be used. In general, a solvent which is regarded as good solvent for a thermoplastic resin identical with that formed by adsorption and polymerization on polytetrafluoroethylene can be used.

In the milling and shaping treatment of the polymeric mixture, sufficient milling gives a network structure and brings about less contraction of the resulting shaped article. Otherwise, contraction of the shaped article will take place. In this case, it will be necessary for preventing contraction to remove the thermoplastic resin from the shaped article under such condition that the article is stretched or fixed in at least one direction. The resulting shaped article may further be subjected under relaxation or tension to heat treatment or baked by heating at about 327°C. or higher.

A filler which can be removed by evaporation, decomposition, extraction and dissolution may be added at the stage of mixing the monomer or milling the polymeric mixture and then removed, after removal of the thermoplastic resin followed by any optical heat treatment, according to a method suitable for removing the specified filler, thereby forming micropores corresponding to the size of the filler.

A porous shaped material of polytetrafluoroethylene obtained by the process of this invention is characterized by very fine pores. According to this invention, it is also possible to obtain a porous material providing micropores formed by removal of said filler jointly with such very fine pores, in addition to said porous shaped article.

A porous shaped material of polytetrafluoroethylene obtained by this invention chiefly in the form of a sheet, rod or thread is a white opaque solid having a fine foam ratio when freed from other fillers. The material in the form of sheet has leather-like touch and appearance. An extremely high strength can be imparted to the material. The surface is smooth, non-tacky and low in friction. In addition, the material is very flexible and high in bendability. The foam ratio of the porous shaped material of polytetrafluoroethylene can be varied from a small value to a large value.

Distribution of the micropores can be controlled by selecting the milling condition. It is a characteristic feature of this invention that a material having especially fine and uniform pores can be manufactured.

Since the porous shaped material of polytetrafluoroethylene obtained according to this invention is a substance having continuous foams, the use of the material in the form of a membrane allows permeation of gas.

Uniformity of the material is shown by the fact that the gas-permeable membrane comprising continuous foams has micropores smaller than a certain size but no micropores larger than such size and is substantially or perfectly devoid of pinholes as will be described hereunder.

When the micropores are small in comparison with a mean free path of gas molecules, the gas shows molecular diffusion and its permeation rate is not dependent on pressure. If the micropores are larger and the gas shows no molecular diffusion, however, its permeation rate will depend on pressure. Accordingly, when the degree of dependency on pressure is found low on measurement of gas permeation rate, the number of pinholes may be considered to be very small. In a permeation experiment using different gas molecules having approximately equal viscosities, the use of relatively large micropores makes no difference in permeation rate by the weight of gas molecules, whereas the use of small micropores in comparison with an average passing distance of the gas molecules makes difference in permeation rate by the weight of gas molecules. For example, when the difference in permeation rate is large between helium and air which are almost equal in viscosity, the porous membrane is considered to be small in the number of pinholes and to be composed of such micropores as permitting molecular diffusion.

As will be evident from the Examples, a membrane manufactured according to this invention for the specified purpose permits only small deviation of the permeation rate by pressure and shows a large difference in the permeation rate between helium and air.

The porous shaped material of polytetrafluoroethylene is distinguished by its porosity, toughness and bendability and has extremely uniform micropores. Thus, the material is useful as membrane for diffusive separation of gases, especially isotopes and rare gas elements. Since polytetrafluoroethylene is known to have very strong resistivity to corrosive gases such as uranium hexafluoride, boron trifluoride, silicon tetrafluoride, etc., a porous membrane obtained according to this invention is particularly useful for separation of isotopes of these gases. In addition to such application, the porous material of this invention possessing the excellent characteristics of polytetrafluoroethylene has a wide variety of uses as ordinary porous material.

The porous material of this invention can be used, for example, as partition membrane for separation of liquids such as partition membrane for electrolytic apparatus and cells or as filter taking advantage of such excellent characteristics as chemicals-resistance, heat-resistance, non-tackiness, etc.

Furthermore, the porous membrane obtained according to this invention is suitable with inks and also printable. Thus, it is applicable as fire-resisting and antiweathering papers. It is also possible to apply the material as clothing, taking its leather-like nature into consideration. The use of the material as carrier for catalysts is also thinkable, taking advantage of its porosity. Besides these, the material can be used as ion exchanger and electrode material.

This invention will be explained more in detail by the following examples but the scope of this invention is not limited thereby.

EXAMPLE 1

To 500 g. of fine powders of unbaked polytetrafluoroethylene for use in shaping (apparent specific gravity: Ca. 0.45) obtained by dispersion polymerization were added 500 g. of methyl methacrylate containing 1 g. of azo-bis-isobutyronitrile as polymerization initiator and 1.5 g. of dodecylmercaptan as chain transfer agent, the methyl methacrylate having been treated with an aqueous caustic soda solution to remove any polymerization inhibitor and washed well with water. Almost all of the methyl methacrylate was adsorbed to the fine powders of polytetrafluoroethylene.

The mixture was placed in a 2 liter autoclave and, after replacing air therein by nitrogen, maintained at 80°C. for 24 hours.

A polymeric mixture of polytetrafluoroethylene and (polymethylmethacrylate) was obtained as solid mass.

The mixture, when milled with a milling roll at 170°C., was hardly coiled around the roll at the initial stage. As the milling proceeded, however, the fine powdery polytetrafluoroethylene was gradually stretched and obtained in the form of a sheet strong in the direction of the roll if the mixture was taken out on the way in the form of a sheet.

When the milling treatment was continued without taking out the mixture on the way, the mixture became strong also in the transverse direction and simultaneously was hardly coiled around the roll. The milling treatment was stopped at this stage and the mixture was taken out in the form of a sheet having a thickness of about 0.4 mm. This sheet was shaped by means of a press operated at 230°C. to form a sheet having a thickness of about 0.2 mm, which was milky white and more or less tended to become translucent.

10 Grams of this sheet was dipped all day in tetrahydrofuran, washed for 8 hours with tetrahydrofuran at its boiling point to extract poly(methyl methacrylate) and dried to yield 5 g. of a white opaque sheet which was not contracted in thickness, width and length in comparison with the original sheet and was tough and flexible like leather.

The permeation rates of this sheet measured by air ($P_{air}$) (mol mm/cm².min. cm Hg) were as follows: $P_{air} = 4.7 \times 10^{-6}$ in the case of an average pressure being 10 cm Hg, $P_{air} = 4.8 \times 10^{-6}$ in the case of 20 cm Hg and $P_{air} = 4.9 \times 10^{-6}$ in the case of 30 cm. Hg. Deviation of the permeation rate by pressure was extremely small.

This sheet had a strength of 2.0 kg./mm². The gas permability of this sheet measured by helium and air was as follows: $P_{He} = 1.24 \times 10^{-5}$ and $P_{air} = 4.8 \times 10^{-6}$. This result lead to $P_{He}/P_{air} = 2.6$. In addition, the following results were obtained for hydrogen and deuterium: $P_{H_2} = 1.92 \times 10^{-5}$, $P_{D_2} = 1.37 \times 10^{-5}$ and $P_{H_2}/P_{D_2} = 1.40$. The sheet had highly uniform micropores and was useful for diffusive separation of isotopes.

An IR-absorption analysis of this sheet showed that it contained a trace amount of remaining poly(methyl methacrylate). If it is necessary to remove entirely the remaining adsorbed polymer, the following treatment may be carried out: This sheet is placed in an electric furnace heated at 280°C. and held for 12 hours while recycling air to obtain a white sheet having a permeation rate variable only within the range of experimental errors. When this sheet was pressed at room temperature with a 100 kg/cm² press and then subjected to IR-adsorption analysis, it was found that no poly(methyl methacrylate) remained in the sheet.

EXAMPLE 2

In a 500 cc pressure ampule were placed 50 g. of fine powders of polytetrafluoroethylene for use in shaping (apparent specific gravity: ca. 0.60) obtained by emulsion polymerization and 250 cc of pure water having 0.05 g. of Poval (saponification degree: 78 percent) dissolved therein. To this mixture was added 0.05 g. of azo-bis-isobutyronitrile. The air in the ampule was replaced by nitrogen at room temperature and 60 g. of monomeric vinyl chloride were added to the mixture. The ampule was held at 60°C. in a rotary constant-temperature tank for 48 hours. After separation of the solid, the residue was dried to obtain 104 g. of a powdery substance containing coarse granules. This substance was a polymeric mixture having dispersed homogeneously thereinto polyvinyl chloride and polytetrafluoroethylene.

To this mixture were added 2 g. of a tin-containing stabilizer for polyvinyl chloride and the mixture was milled as described in Example 1 using a milling roll maintained at 160°C. The milled mixture taken out in the form of a sheet having a thickness of about 0.5 mm was shaped to a sheet having a thickness of about 0.2 mm using a press heated at 200°C. The sheet was washed in tetrahydrofuran at its boiling temperature to extract polyvinyl chloride. After drying, a white opaque sheet was obtained which was not contracted and had a strength of 1.8 kg./cm$^2$.

EXAMPLE 3

To 500 g. of fine powders of polytetrafluoroethylene for use in shaping (apparent specific gravity: 0.60) obtained by emulsion polymerization were adsorbed 500 g. of styrene monomer and 1 g. of diisopropyl peroxydicarbonate at a low temperature. The mixture was placed in a 2 liter glass autoclave and, after replacing air therein by nitrogen, maintained at 30°C. for 20 hours. The polymerization of the monomeric styrene proceeded to afford a polymeric mixture which was then milled as described in Example 1 with a milling roll to obtain a sheet having a thickness of 0.4 mm.

This sheet was shaped by means of a hot press operated at 230°C. to form a sheet having a thickness of about 0.1 mm.

The sheet was placed in an air furnace heated at 200°C. and the temperature was elevated gradually to 300°C. in 40 hours while introducing a sufficient amount of air. The solvent was then held at this temperature for 12 hours. Almost all of polystyrene was thus removed to leave a slightly yellow sheet which was tough and flexible and had leather-like touch.

What is claimed is:

1. A process for producing a porous article of polytetrafluoroethylene having fine and uniform pores, which comprises polymerizing a polymerizable monomer which has been adsorbed or attached to fine particles of polytetrafluoroethylene and is capable of forming a thermoplastic resin, the amount of said polymerizable monomer being at least 30 percent by weight based on said polytetrafluoroethylene, thereby forming a polymeric mixture of polytetrafluoroethylene and the thermoplastic resin formed by polymerization, milling said polymeric mixture at a temperature higher than the softening point of the thermoplastic resin to form a shaped article comprising a fibrous material having a network structure, and thereafter removing said thermoplastic resin from said shaped article to produce a porous polytetrafluoroethylene article having fine and uniform pores.

2. The process according to claim 1 wherein the polymerizable monomer capable of forming the thermoplastic resin is selected from the group consisting of methyl methacrylate, styrene, vinyl chloride, vinylidene chloride, and copolymers thereof.

3. The process according to claim 1 wherein the polymeric mixture is admixed with an additional synthetic resin such as polyvinyl chloride and then milled to form a shaped article.

4. The process according to claim 1 wherein the polymeric mixture admixed with a filler is milled to form a shaped article, the thermoplastic is removed from the shaped article and then the filler is removed therefrom.

5. The process according to claim 1 wherein the shaped article is extracted with a solvent to remove the thermoplastic resin.

6. The process according to claim 5 wherein said thermoplastic resin is poly(methyl methacrylate) and wherein said solvent is selected from the group consisting of benzene, toluene, ethylbenzene, chloroform, methyl ethyl ketone, acetone, tetrahydrofuran, tetrachloroethane, acetonitrile and butanone.

7. The process according to claim 5 wherein said thermoplastic resin is polystyrene and said solvent is selected from the groups consisting of benzene, toluene, tetrahydrofuran and chloroform.

8. The process according to claim 5 wherein said thermoplastic resin is polyvinyl chloride and said solvent is selected from the group consisting of tetrahydrofuran, cyclohexanone, nitrobenzene, dimethylsulfoxide and dimethylformamide.

* * * * *